(12) United States Patent
Horne

(10) Patent No.: US 7,088,673 B2
(45) Date of Patent: Aug. 8, 2006

(54) DYNAMICALLY-SCALABLE SYSTEM AND METHOD FOR MULTIPLE USER ACCESS UTILZING MULTI-BIT AND MULTI-CODE ORTHOGONAL MULTIPLEXING

(75) Inventor: David M. Horne, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 930 days.

(21) Appl. No.: 10/000,751

(22) Filed: Nov. 2, 2001

(65) Prior Publication Data

US 2003/0086364 A1 May 8, 2003

(51) Int. Cl.
*H04J 11/00* (2006.01)
(52) U.S. Cl. ...................................... 370/209
(58) Field of Classification Search ......... 370/208–209
See application file for complete search history.

(56) References Cited

U.S. PATENT DOCUMENTS

| 6,026,118 A | 2/2000 | Horne |
| 6,134,263 A | 10/2000 | Horne |
| 6,185,246 B1 * | 2/2001 | Gilhousen ................... 375/130 |
| 6,317,413 B1 * | 11/2001 | Honkasalo .................. 370/209 |

* cited by examiner

Primary Examiner—Chi Pham
Assistant Examiner—Ronald Abelson
(74) Attorney, Agent, or Firm—Blakely, Sokoloff, Taylor & Zafman LLP (57) ABSTRACT

A code controller partitions a set of orthogonal spreading codes into a plurality of subsets of orthogonal spreading codes and allocates and transmits the subsets of orthogonal spreading codes to users. A transmitter device partitions the received subset of orthogonal spreading codes into partitioned sets. The partitioned sets are further expanded to include complement codes of the orthogonal spreading codes and the codes are mapped into a code index to create a spreading code set. A window of contiguous multi-bit input data to be transmitted by the transmitter device is partitioned into equal-size subsets, which are then mapped to a data index, to create a data set. The data set is mapped to the spreading code set to create a multiplex of spreading codes, and the multiplex of spreading codes are then summed to form a code multiplex. The code multiplex can then be sent in one transmit opportunity.

76 Claims, 6 Drawing Sheets

| # SIMULTANEOUS USERS | BANDWIDTH EXPANSION FACTOR |
|---|---|
| 2 | 64 |
| 4 | 32 |
| 8 | 16 |
| 16 | 8 |
| 32 | 4 |
| 64 | 2 |

FIG. 3A

| USER # | BANDWIDTH UNITS ASSIGNED |
|---|---|
| 1 | 4 |
| 2 | 2 |
| 3 | 32 |
| 4 | 2 |
| 5 | 16 |
| 6 | 4 |
| 7 | 8 |
| 8 | 32 |
| 9 | 16 |
| 10 | 8 |
| 11 | 4 |
| TOTAL | 128 |

FIG. 3B

EXAMPLE N=16; G=2; NON-KEYED (LINEAR) MAPPING

DYNAMICALLY-SCALABLE SYSTEM AND METHOD FOR MULTIPLE USER ACCESS UTILZING MULTI-BIT AND MULTI-CODE ORTHOGONAL MULTIPLEXING

BACKGROUND

1. Field of the Invention

The present invention relates to the field of data communications. More particularly, the invention relates to a dynamically-scalable system and method that utilizes multi-bit and multi-code orthogonal multiplexing to allow for multiple user access (e.g. multiple users each transmitting and/or receiving multi-bit data) in a direct sequence spread spectrum communication system.

2. Description of Related Art

Direct Sequence Spread Spectrum (DSSS) techniques rely on the use of pseudo-noise carriers, also called spreading codes, spreading sequences, code sequences and chip sequences, and a transmission bandwidth, which is much wider than the minimum required to transmit the information. The transmitter spreads the information by modulating the information with a pseudo-noise spreading sequence. At the receiver, the information is despread to recover the base information. This despreading is accomplished by correlating the received, spread-modulated, signal with the spreading sequence used for the transmission. DSSS is sometimes referred to by the shorthand name "direct spread."

The modulating signal, such as a pseudo-random spreading code signal, possesses a chip rate (analogous to carrier frequency), which is much larger than the data rate of the information signal. This characteristic is required for efficient spreading. Each state of the pseudo-random spreading sequence is referred to as a chip. The spreading sequence (chip sequence) directly modulates each bit of the information signal, hence the name direct spread. Pseudo-randomness of the spreading signal is required in order to recover the original information signal. Since the spreading sequence is deterministic, it can be exactly duplicated at the receiver in order to extract the information signal. If it were truly random, extraction of the information signal via correlation receiver would not be possible.

The spreading operation causes the signal power to be depleted uniformly across the spread bandwidth. Thus, the spread spectrum signal will appear buried in noise to any receiver without the despreading signal. Consequently, it is not only difficult to jam, but it is also difficult to detect its presence in any bandwidth. Any undesired signal picked up during transmission is spread by the receiver in the same way that the transmitter spread the desired signal originally. In other words, the receiver spreads undesired signals picked up during transmission, while simultaneously despreading, or demodulating, the desired information signal. When viewed as a transmit/receive operation, the desired signal is spread-modulated twice, giving back the original signal, while in-band interference is spread-modulated once, and thereby depleted across the full spread bandwidth.

Similarly, Direct Spread Code Division Multiple Access (DS CDMA) is an adaption of conventional DSSS, which accommodates multiple simultaneous access through the use of mutually orthogonal spreading codes. Mutually orthogonal means that the cross correlation of any spreading code in the set is small (ideally zero). In an ideally orthogonal system, orthogonality not only means that there is no mixing of signals, but it also means that there is no interference between signals. In a conventional DS CDMA system, each station is assigned a single spreading code, which conveys one bit of information. All users assigned to a given channel broadcast either a true or complement version of their assigned spreading code simultaneously. Since the codes are orthogonal, each user's spreading code is uniquely decoded by the receiver. The multiple-access is via the orthogonal properties of the spreading code, hence the name CDMA. Like the previously described DSSS systems, stations only transmit one bit of information at a time.

Thus, in conventional DSSS and DS CDMA systems, an input binary data stream is transmitted one bit at a time, and each bit is modulated with a spreading code, wherein each successive transmission is independent of prior transmissions. Furthermore, the spread modulation can occur in either the frequency domain (i.e. by frequency spreading) or the time domain (i.e. by time spreading). Unfortunately, both methods (frequency and time spreading) incur high penalties for transmission efficiency by trading off efficiency for high redundancy. Typically, conventional DSSS and DS CDMA techniques only provide a bit encoding density of (1/N) *100%, where N is the spreading code length, and only transmit one bit at a time.

BRIEF DESCRIPTION OF THE DRAWINGS

The features and advantages of the present invention will become apparent from the following description of the present invention in which.

DESCRIPTION

Embodiments of the present invention relate to methods, devices, and machine-readable mediums, which allow for a dynamically-scalable system that utilizes multi-bit and multi-code orthogonal multiplexing to allow for multiple user access (e.g. multiple users each transmitting and/or receiving multi-bit data) to achieve high bit densities in a direct sequence spread spectrum (DSSS) system.

A code controller selects a set of orthogonal spreading codes. The code controller partitions the set of orthogonal spreading into a plurality of subsets of orthogonal spreading codes and allocates the subsets of orthogonal spreading codes to users. The code controller further transmits the allocated subsets of orthogonal spreading codes to the users (e.g. users utilizing transmitter and receiver devices). A transmitter device partitions the received subset of orthogonal spreading codes into partitioned sets. The partitioned sets are further expanded to include complement codes of the orthogonal spreading codes. The orthogonal spreading codes and the complement codes are mapped into a code index to create a spreading code set. A window of contiguous multi-bit input data (e.g. more than 2 bits) to be transmitted by the transmitter device is partitioned into equal-size subsets, which are then mapped to a data index, to create a data set. Thus, a common abstract representation of the two sets—the spreading code set and the data set—is created regardless of their starting sizes or values. The data set is mapped to the spreading code set to create a multiplex of spreading codes, and the multiplex of spreading codes are then summed to form a code multiplex. The code multiplex can then be sent in one transmit opportunity (e.g. from the transmitter device to a receiver device). The above operations encode the data such that the original input data, and the sequence of that original input data, can be reconstructed at the receiver device—without any channel overhead.

Thus, embodiments of present invention by utilizing multi-bit and multi-code orthogonal multiplexing allow conflict-free multiple user access (e.g. multiple users each transmitting and/or receiving multi-bit data via transmitter and receiver devices, respectively) in a direct sequence spread spectrum (DSSS) system. In some embodiments, the code controller dynamically allocates and transmits different subsets of orthogonal spreading codes to different users, in which, the dynamically allocated subsets of orthogonal spreading codes have different numbers of orthogonal spreading codes such that users can be dynamically allocated different bandwidths. Advantageously, the window of multi-bit input data (e.g. having two or more bits of data) can consist of any data pattern (all ones, all zeros, or anything in between) and achieves a constant encoding density of 100%, compared to (1/N)*100% for conventional DSSS and Direct Spread Code Division Multiple Access (DS CDMA) approaches, where N is the spreading code length. Moreover, the input data to be transmitted is mapped in such a way, as will be described in more detail hereinafter, to convey greater bandwidth per transmission than conventional DSSS and DS CDMA approaches (e.g. more than one bit can be transmitted per transmit opportunity).

In the following description, the various embodiments of the present invention will be described in detail. However, such details are included to facilitate understanding of the invention and to describe exemplary embodiments for employing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known methods, types of data, protocols, procedures, components, networking equipment, electrical structures and circuits, are not described in detail, or are shown in block diagram form, in order not to obscure the present invention. Furthermore, aspects of the invention will be described in particular embodiments but may be implemented in hardware, software, firmware, middleware, or a combination thereof.

Figure 1:
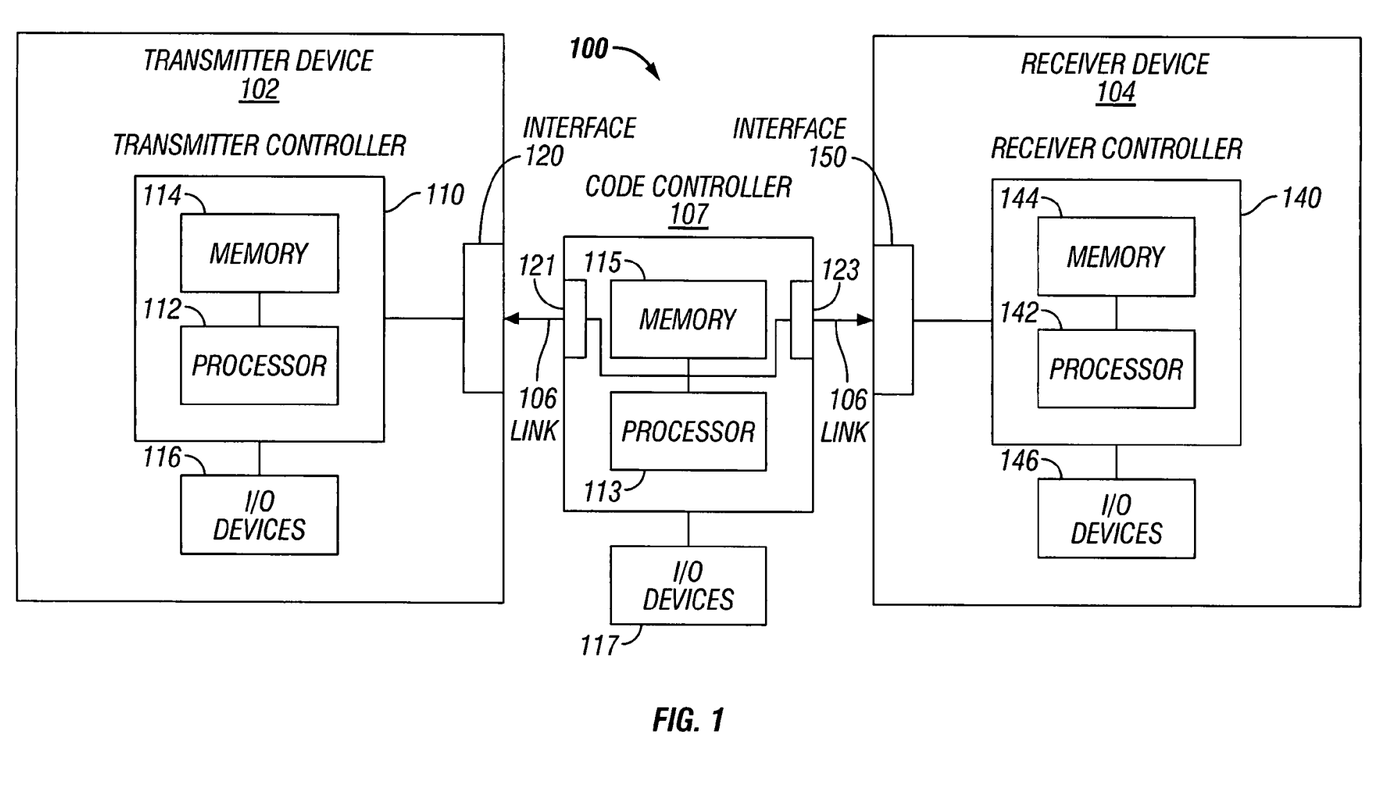
FIG. 1 is a diagram illustrating an exemplary system environment that can employ a multi-bit and multi-code orthogonal multiplexing method to allow for multiple user access according to one embodiment of the invention.

FIG. 1 is a diagram illustrating an exemplary system environment 100 that can employ a dynamically-scalable method that utilizes multi-bit and multi-code orthogonal multiplexing to allow for multiple user access (e.g. multiple users each transmitting and/or receiving multi-bit data via transmitter and receiver devices, respectively) according to one embodiment of the invention. As shown in the exemplary environment 100, a transmitter device 102 can be coupled to a receiver device 104 through a link 106. Generally, the environment 100 is a voice and data communications system capable of transmitting voice, audio, data, multimedia (e.g. a combination of audio and video), Web pages, video, or generally any sort of data. It should be appreciated that in the exemplary environment 100, there may be multiple transmitter and receiver devices 102 and 104 coupled together through the link 106. Only one transmitter and one receiver device 102 and 104 are shown in FIG. 1 for brevity.

The transmitter and receiver devices 102 and 104 can include standard telephones, cell-phones, digital phones, mobile computers (e.g. personal digital assistant (PDA), a wearable computer, a wireless handset, a Palm Pilot, etc.), computer systems (e.g. personal computer (laptop/desktop), network computer, server computer, or any other type of computer), or any other sort of computing/telecommunication device capable of processing data.

As is illustrated in FIG. 1, transmitter and receiver devices 102 and 104 are bi-directionally coupled by a link 106. A "link" is broadly defined as a communication network formed by one or more transport mediums. The transmitter and receiver devices 102 and 104 can communicate via the link 106 utilizing one or more of a wireless system, cellular phone system, the plain old telephone system (POTS), cable, Digital Subscriber Line, Integrated Services Digital Network, satellite connection, computer network (e.g. a wide area network (WAN), the Internet, or a local area network (LAN), etc.), or generally any sort of private or public telecommunication system, and combinations thereof. Examples of a transport medium include, but are not limited to wireless channels (e.g. radio frequency (RF), terrestrial, satellite, or any other wireless signaling methodology), electrical wire, optical fiber, cable including twisted pair. etc.

The data traffic communicated between the transmitter and receiver device 102 and 104 over link 106 can be of any type analog, digital, etc., and in any type of format or protocol—e.g. wireless protocols, cellular protocols, Internet Protocol (IP), Asynchronous Transfer Mode (ATM), Frame Relay (FR), Point-to-Point Protocol (PPP), Voice over Internet Protocol (VoIP), or any other sort of data protocol. The data traffic between the transmitter and receiver device 102 and 104 over link 106 may be of any type including but not limited to—voice, audio, graphics, video, e-mail, Fax, text, multi-media, documents and all other generic forms of data.

It should be appreciated that in the exemplary environment 100, there may be multiple transmitter and receiver devices 102 and 104 coupled together through the link 106 and the link 106 may include multiple connections therebetween (e.g. base stations, satellite connections, POTS connections, cable head-ends, computer systems, servers, personal computers, etc.). In particular, the link 106 includes a code controller 107. As will be discussed in more detail later, the code controller 107: selects a set of orthogonal spreading codes, partitions the set of orthogonal spreading into a plurality of subsets of orthogonal spreading codes and allocates and transmits the subsets of orthogonal spreading codes to users, which allows for multiple user access (e.g. multiple users each transmitting and/or receiving multi-bit data via transmitter and receiver devices, respectively). The code controller 107 may be any sort of device to perform these functions. For example, the controller 107 could be: a wireless station, a base station, a cable head-end, a computer system, a server, a personal computer, or any other sort of computing/telecommunication device capable of processing data. Moreover, it should be appreciated that the FIG. 1 environment is only exemplary and that embodiments of the present invention can be used with any type of wireless or wired telecommunication system and/or computer network, protocols, and combinations thereof.

In one embodiment, the functions of the dynamically-scalable method that utilizes multi-bit and multi-code orthogonal multiplexing to allow for multiple user access invention, as will be discussed, can be implemented in both the transmitter and receiver devices 102, 104 and the code controller 107. In an exemplary embodiment, the transmitter and receiver devices 102, 104 and the code controller 107 generally include, among other things, a processor, data storage devices such as non-volatile and volatile memory, and interfaces (e.g. antennas, modems, or other types of network interfaces etc.). For example, the transmitter device 102 may include a transmitter controller 110 having a processor 112 and a memory 114, Input/Output devices 116, and an interface 120. Similarly, the receiver device 102 may include a receiver controller 140 having a processor 142 and a memory 144, Input/Output devices 146, and an interface 150. Further, the code controller 107 may include a processor 113 and a memory 115, Input/Output devices 117, and interfaces 121, 123.

The Input/Output devices of the transmitter and receiver devices 102, 104 and the code controller 107, respectively, may include among other things: display devices (e.g. a liquid crystal display (LCD)), keypads, screens to receive written information from a pen or another device, a mouse, a trackball, a pointing device, a modem, a printer, media cards (e.g. audio, video, graphics), network cards, peripheral controllers, a hard disk, a floppy drive, an optical digital storage device, a magneto-electrical storage device, Digital Video Disk (DVD), Compact Disk (CD), etc., or any combination thereof.

Moreover, the interfaces 120, 121, 123, and 150 can be any sort of suitable interface for the transmitter device 102, receiver devices 104, and the code controller 107, and the type of links 106 therebetween, respectively. For example, plain old telephone system (POTS) transmitter/receivers, cellular telephone transmitters/receivers, wireless transmitters/receivers, antennas, network interface cards, internal/external modems (standard telephone modem, Digital Subscriber Line (DSL) modem, cable modem, etc.), etc., can be used, or any combination thereof.

Those skilled in the art will recognize any combination of the above components, or any number of different components, peripherals, and other devices, may be used with transmitter and receiver devices 102, 104, and the code controller 107, and that this discussion is for explanatory purposes only.

In continuing with the example of the exemplary transmitter and receiver devices 102, 104 and code controller 107, the transmitter and receiver devices and code controller may operate under the control of an operating system that is booted into the non-volatile memory of the device for execution when the device is powered-on or reset. In turn, the operating system controls the execution of one or more computer programs. These computer programs typically include application programs that aid the user in utilizing the device.

In particular, in one embodiment of the invention, aspects of the dynamically-scalable method that utilizes multi-bit and multi-code orthogonal multiplexing to allow for multiple user access invention can be implemented in the transmitter and receiver devices 102, 104 and code controller 107 under the control of their respective processor 112, 142, and 113 and in conjunction with their respective memories 114, 144, and 115. The processors process information in order to implement the functions of the dynamically-scalable method that utilizes multi-bit and multi-code orthogonal multiplexing to allow for multiple user access, as will be discussed. As illustrative examples, the "processor" may include a digital signal processor, a microcontroller, a state machine, or even a central processing unit having any type of architecture, such as complex instruction set computers (CISC), reduced instruction set computers (RISC), very long instruction word (VLIW), or hybrid architecture. The memories 114, 144, and 115 can be non-volatile or volatile memory, or any other type of memory, or any combination thereof. Examples of non-volatile memory include a hard disk, flash memory, battery-backed random access memory, Read-only-Memory (ROM) and the like whereas volatile memory includes random access memory (RAM), dynamic random access memory (DRAM) or static random access memory (SRAM), and the like.

The dynamically-scalable method that utilizes multi-bit and multi-code orthogonal multiplexing to allow for multiple user access can be implemented as one or more instructions (e.g. code segments), to perform the desired functions of the invention. When implemented in software, the elements of the present invention are the instructions/code segments to perform the necessary tasks. The instructions which when read and executed by a machine or processor (e.g. processor 112, 142, and 113), cause the machine or processor to perform the operations necessary to implement and/or use embodiments of the invention. The program or code segments can be stored in a machine readable medium (e.g. a processor readable medium or a computer program product), or transmitted by a computer data signal embodied in a carrier wave, or a signal modulated by a carrier, over a transmission medium or communication link. The machine-readable medium may include any medium that can store or transfer information in a form readable and executable by a machine (e.g. a processor, a computer, etc.). Examples of the machine readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via networks such as the Internet, Intranet, etc.

Those skilled in the art will recognize that the exemplary environments illustrated in FIGS. 1 are not intended to limit the present invention. Indeed, those skilled in the art will recognize that other alternative system environments, transmitter devices, receiver devices, and code controllers may be used without departing from the scope of the present invention. Furthermore, while aspects of the invention and various functional components have been described in particular embodiments, it should be appreciated these aspects and functionalities can be implemented in hardware, software, firmware, middleware or a combination thereof.

Figure 2A:
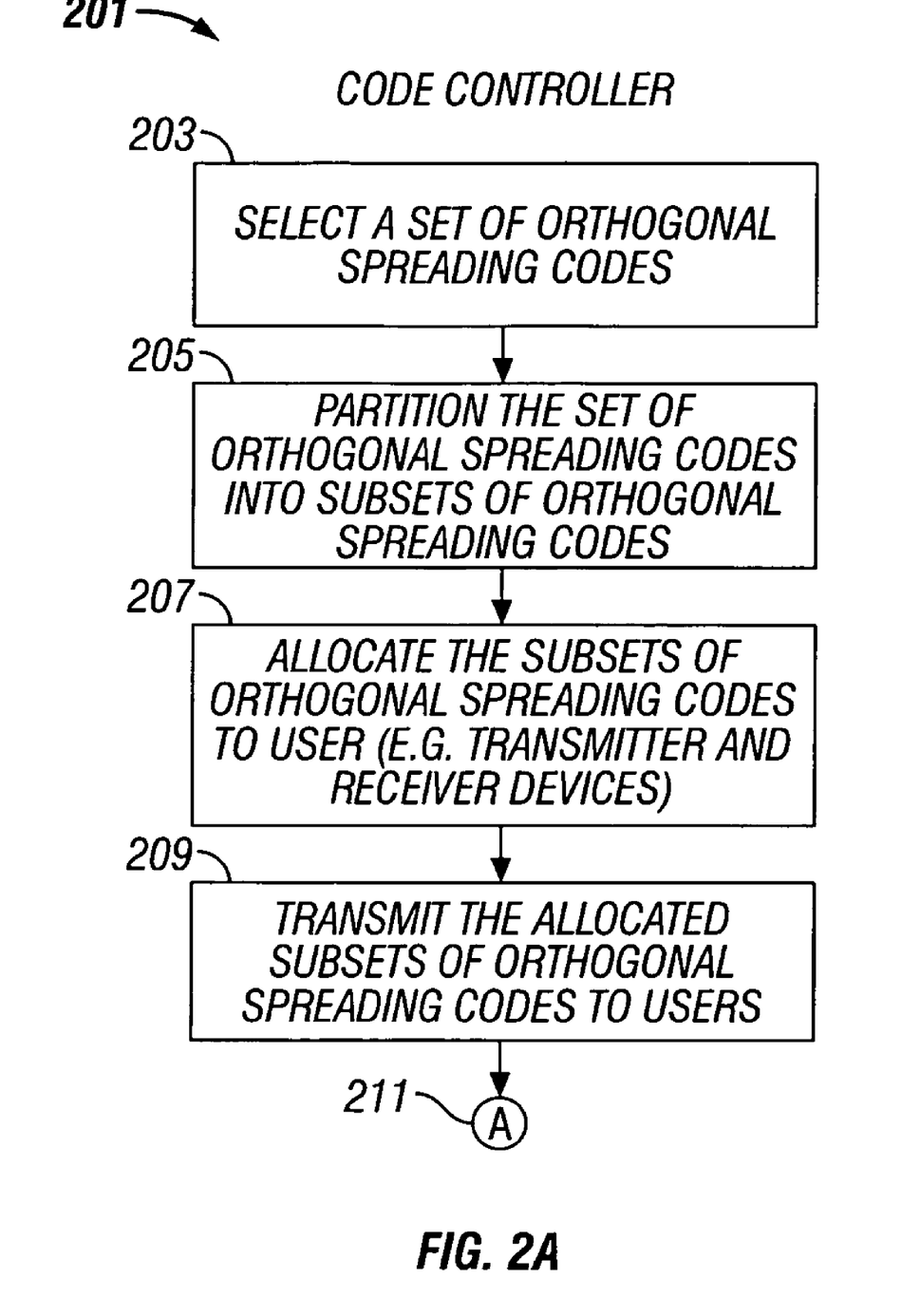
FIG. 2a is a flow diagram illustrating a multi-bit and multi-code orthogonal multiplexing method for multiple user access, at the code controller, according to one embodiment of the invention.

FIG. 2a is a flow diagram 201 illustrating a multi-bit and multi-code orthogonal multiplexing method for multiple user access, at the code controller 107, according to one embodiment of the invention. At block 203, the code controller 107 selects a set of orthogonal spreading codes. Next, at block 205, the code controller 107 partitions the set of orthogonal spreading codes into a plurality subsets of orthogonal spreading codes. The code controller 107 allocates the subsets of orthogonal spreading codes to users (e.g. users that wish to transmit and/or receive multi-bit data via transmitter and receiver devices, respectively) (block 207). The code controller 107 then transmits the allocated subsets of orthogonal spreading codes to the users (block 209). At block 211, the process continues on to the transmitter side, e.g. the transmitter device 102, as will be discussed with reference to FIG. 2b.

By performing a partitioning of the full set of orthogonal spreading codes into a plurality of subsets of orthogonal spreading codes and allocating the subsets across multiple users, conflict-free multiple access by users (e.g. multiple users communicating multi-bit data via transmitter and receiver devices, respectively) can be achieved. This allocation can be controlled centrally by the code controller 107. Furthermore, each user obtains the benefits of increased encoding density and greater bandwidth per transmission than conventional DSSS and DS CDMA approaches (e.g. more than one bit can be transmitted per transmit opportunity) because of the multi-bit and multi-code orthogonal multiplexing process steps (as will be discussed with reference to FIGS. 2b, 2c, and 4). The determining factor in implementing multiple access among users is the size of the set of orthogonal spreading codes selected by the code controller 107. This will be discussed in more detail below with reference to FIGS. 3a and 3b. As will be discussed, dynamic bandwidth assignment on a per-user basis can be implemented, as well as, different bandwidth assignments for different users.

Figure 2B:
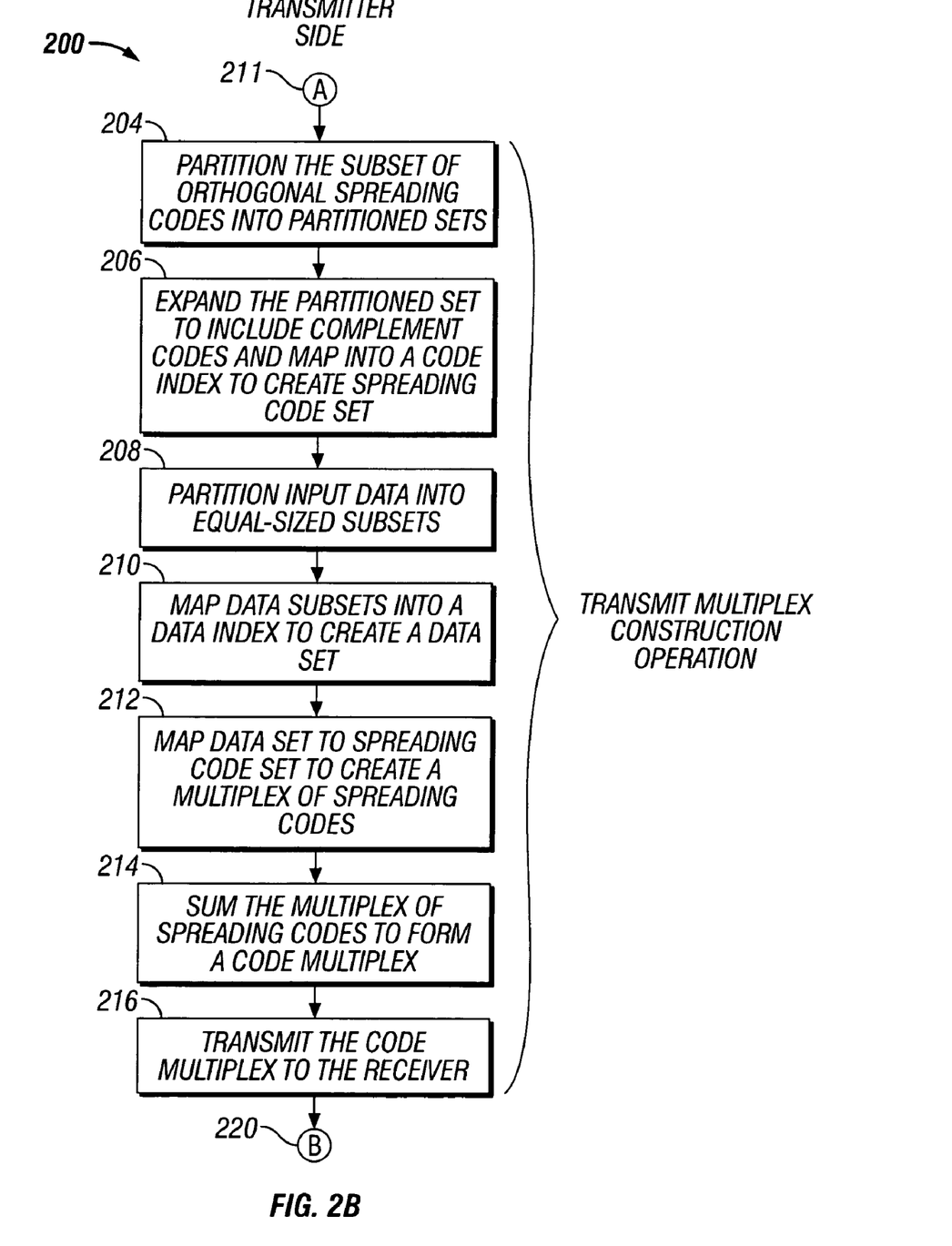
FIG. 2b is a flow diagram illustrating a multi-bit and multi-code orthogonal multiplexing method for multiple user access, at the transmit side, according to one embodiment of the invention.

Turning now to FIG. 2b, FIG. 2b is a flow diagram 200 illustrating a multi-bit and multi-code orthogonal multiplexing method for multiple user access, at the transmit side (e.g. at the transmitter device 102), according to one embodiment of the invention. At block 211, a transmitter device 102 receives the allocated subset of orthogonal spreading codes for the user. Next, at block 204, the transmitter device 102 partitions the subset of orthogonal spreading codes into partitioned sets. The partitioned sets are expanded to include the complement codes of the orthogonal spreading codes and the orthogonal spreading codes and the complement codes of the orthogonal spreading codes are mapped into a code index to create a spreading code set (block 206). It should be appreciated that the results of the partitioning, mapping, and sequence method blocks and definitions (blocks 204 and 206), e.g., the subset of orthogonal spreading codes, the partitioned subset of orthogonal spreading codes, the expanded partitioned sets including complements, the code index, the spreading code set, etc., as previously discussed, are usually required to be known at the receiver device 104, a priori, for the method to work properly.

Looking at the input data, the multi-bit input data is partitioned into equal-sized data subsets (block 208). These data subsets have a minimum size of 2 bits, and the input data usually takes the form of a window of data that can be broken up into equally-sized data subsets. Next, the equal-sized data subsets are mapped into a data index to create a data set (block 210). At block 212, a data set is mapped to the spreading code set to create a multiplex of spreading codes. Then, at block 214, the multiplex of spreading codes are summed to create a code multiplex. Blocks 204 through 214 represent what could be termed the transmit multiplex construction of operation, in that, these operations create a code multiplex at the transmitter device 102, which is ultimately transmitted via link 106, to the receiver device 104. The transmitting device may also include other operations, such as modulation and/or coding that may be appropriate for the link 106. Accordingly, at block 216 the code multiplex is transmitted to the receiver device 104. At block 220, the process continues on to the receiver side, e.g. the receiver device 104, as will be discussed with reference to FIG. 2c.

Figure 2C:
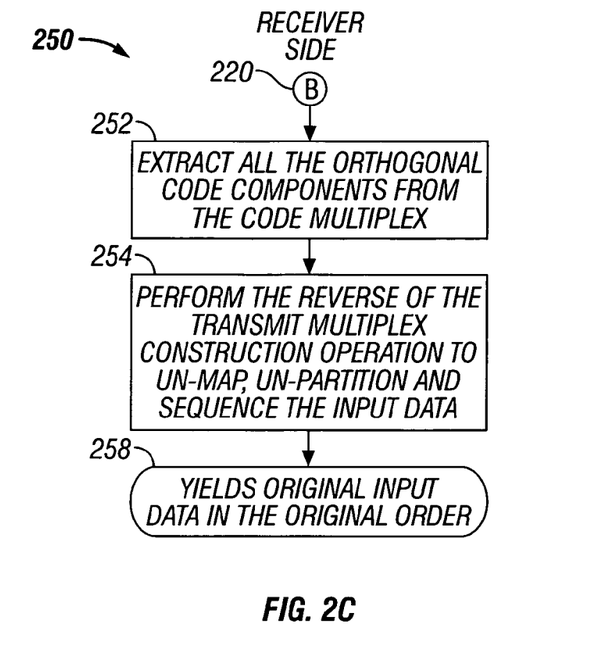
FIG. 2c is a flow diagram illustrating a multi-bit and multi-code orthogonal multiplexing method for multiple user access, at the receive side, according to one embodiment of the invention.

FIG. 2c is a flow diagram 250 illustrating a multi-bit and multi-code orthogonal multiplexing method for multiple user access, at the receive side (e.g. at the receiver device 104) according to one embodiment of the invention. At block 220, the code multiplex is received at the receiver device 104 and all the orthogonal code components are extracted from the code multiplex at block 252. Next, at block 254, the reverse of the transmit multiplex construction operation is performed to unmap, unpartition, and sequence the input data. Thus, at block 258, the original input data is yielded in the original order at the receiver device 104.

Thus, by transmitting a multiplex of distinct orthogonal spreading codes per transmit opportunity—rather than a single code—multiple bits of data can be conveyed per transmit opportunity. Advantageously, by using two sets of multiple partitioning and mapping operations to reduce the data and the spreading code sets to a common abstract representation, respectively, this permits a modified representation of the data set to be mapped onto a modified representation of the spreading code set via a normalized parameter interface. The normalized interface in turn allows the method to scale to arbitrary sizes proportional to $2^N$. Thus, the disclosed method can use the multiplexed orthogonal spreading codes and the multiple operations on the data and spreading code sets to greatly improve bit density per transmit opportunity, while maintaining the inherent desirable properties of direct sequence spread spectrum modulation (DSSS).

As discussed previously, the window of input data can consist of any data pattern (all ones, all zeros, or anything in between) and achieves a constant encoding density of 100%, compared to (1/N)*100% for conventional DSSS and DS CDMA approaches, where N is the spreading code length. Moreover, the disclosed method achieves these bit density gains without dependence on the actual data values being transmitted over time (i.e. without regards to run-length, 0/1 balance, and patterns), restores the natural sequence of the input data values from the original input data upon recovery at the receiver device, and further achieves all of these benefits without any channel overhead.

Furthermore, as previously discussed with reference to FIG. 2a, by having the code controller 107 perform a partitioning of the full set of orthogonal spreading codes into a plurality of subsets of orthogonal spreading codes and allocating the subsets across multiple users, conflict-free multiple access by users (e.g. multiple users communicating multi-bit data via transmitter and receiver devices, respectively) can be achieved. Moreover, each user obtains the benefits of increased encoding density and greater bandwidth per transmission than conventional DSSS and DS CDMA approaches (e.g. more than one bit can be transmitted per transmit opportunity), due to the multi-bit and multi-code orthogonal multiplexing process steps previously discussed.

The determining factor in implementing multiple user access is the size of the set of orthogonal spreading codes selected by the code controller 107. The size of the set of orthogonal spreading codes can be referred to as "N", where N is a power of two. Thus, the number of orthogonal spreading codes of the set of orthogonal spreading codes is a power of two. By decomposing N into a sum of powers of 2, the partitioning for multiple user access is achieved. This further allows for dynamic bandwidth assignment on a per-user basis, and also allows different bandwidth assignments for different users, as will be discussed.

In the most general example case, all users are constrained to have the same bandwidth. For example, this can be achieved by having the code controller 107 partition the set of orthogonal spreading codes such that each subset of orthogonal spreading allocated to each user by the code controller 107 each has the same number of spreading codes. This case simplifies the implementation at the code controller 107, which controls the bandwidth allocation.

Figure 3A:
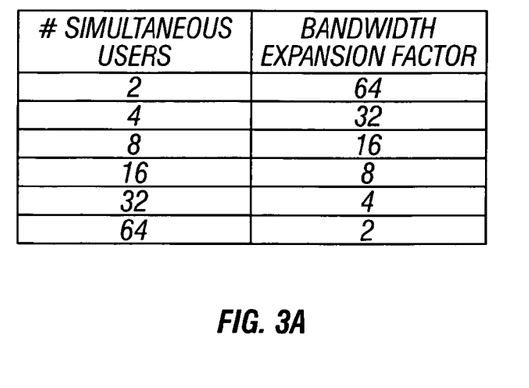
FIG. 3a provides an example of numbers of simultaneous users and bandwidth expansion factors for them, supporting the multi-bit and multi-code orthogonal multiplexing method for multiple user access, where all users are constrained to the same bandwidth, according to one embodiment of the invention.

FIG. 3a provides an example of numbers of simultaneous users and bandwidth expansion factors for them, supporting the multi-bit and multi-code orthogonal multiplexing method for multiple user access, where all users are constrained to the same bandwidth, according to one embodiment of the invention. In this case, the number of spreading codes of the subset of orthogonal spreading allocated to each user by the code controller 107, are equivalent to the bandwidth. In the example of FIG. 3a, the size of the set of orthogonal spreading codes is 128, or N=128. Accordingly, when there are 2 users the bandwidth is 64, when there are 4 users the bandwidth is 32, when there are 8 users the bandwidth is 16, etc.

Conventional CDMA system's become multiple-access-interference limited when the number of simultaneous users exceeds a certain percentage of N, for example 60–70% of the spreading code set size, such that 70–80 simultaneous users could be supported (N=128). However, this is at 1×bandwidth. FIG. 3a, shows that the disclosed method supports 64 simultaneous users at 2×bandwidth, and in addition does not become multiple-access-interference limited because there are never more than 50% of the spreading codes active at a given instant.

For example, if U is considered to be the number of simultaneous users, and U is also constrained to be a power of 2, and B are the bandwidth units assigned (e.g. equally in this case) per user (where B is also a power of 2), the following simple relation results:

$$N=U*B$$

In this example, the bandwidth B can be considered equivalent to the number of spreading codes of the subset of orthogonal spreading allocated to each user by the code controller 107. Thus, a straightforward relationship exists for determining bandwidths needed to support various numbers of users in relation to the size of the set of orthogonal spreading codes to be selected by the code controller 107 in order to implement multi-bit and multi-code orthogonal multiplexing for multiple user access. This allows for bandwidths (e.g. subsets of orthogonal spreading codes) to be dynamically allocated to users (where bandwidths are equally set among users). For example, dynamic allocation can be based upon the number of users entering and exiting the system.

Figure 3B:
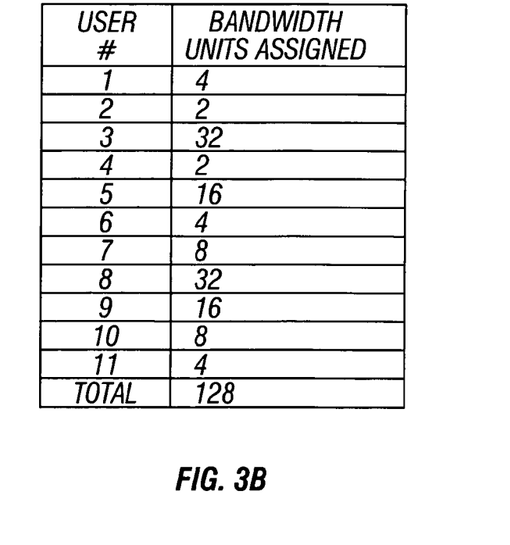
FIG. 3b provides an example of numbers of simultaneous users and bandwidth expansion factors for them, supporting the multi-bit and multi-code orthogonal multiplexing method for multiple user access, where users are provided with differing bandwidths, according to one embodiment of the invention.

For the more general case where U is not a power of 2 (i.e. U is an integer>=2), and where simultaneous users are allocated different bandwidth capabilities, the following bandwidth relation results:

$\Sigma B_i \leq N$ where: $B_i$ is the bandwidth allocation for a given user
$i$=1 to U FIG. 3b provides an example of numbers of simultaneous users and bandwidth expansion factors for them, supporting the multi-bit and multi-code orthogonal multiplexing method for multiple user access, where users are provided with differing bandwidths with respect to the above bandwidth relation, according to one embodiment of the invention. For example, FIG. 3b illustrates one possible partitioning of bandwidth that achieves full utilization (e.g. a sum total that is equal to N) where there are U=11 simultaneous users, and N is still 128. For example, user 1 is allocated 4 bandwidth units, user 2 is allocated 2 bandwidth units, user 3 is allocated 32 bandwidth units, user 4 is allocated 2 bandwidth units, user 5 is allocated 16 bandwidth units, etc. Accordingly, subsets of orthogonal spreading codes allocated to different users by the code controller 107 can have different quantities or numbers of orthogonal spreading codes (e.g. different bandwidths) such that users are allocated different bandwidths.

As another example, using the above bandwidth relation, network policy could state that no user ever gets assigned more than 16 units. User #3 and #8 above would be reduced to 16 bandwidth units, and there would be 32 bandwidth units freed up. These could be assigned to new users—for example, as many as 16 new users at 2 bandwidth units each could be added or as few as 2 new users with 16 bandwidth units each could be added. Accordingly, subsets of orthogonal spreading codes can be dynamically allocated to different users by the code controller 107 and can have different quantities or numbers of orthogonal spreading codes (e.g. different bandwidths) such that users are dynamically allocated different bandwidths.

In other examples, using the above bandwidth relation a DAMA (demand assigned multiple access) technique could be used, with an explicit request/grant protocol for bandwidth assignment between the users and the code controller 107. Since the code controller 107 is allocating all the bandwidth and is aware of the other simultaneous users, no conflict results. Moreover, it should be appreciate that many protocol options are possible, especially in fixed environments, such as cable or fixed wireless.

Furthermore, based on service tiers or equipment capabilities, individual users may be capped in the amount of bandwidth they can request. Also, it is possible to dynamically upgrade or downgrade the service tier and the equipment capabilities. Numerous protocols and levels of flexibility can be designed around the basic multi-bit and multi-code orthogonal multiplexing method (described in FIGS. 2b and 2c) to allow for different varieties of multiple user access—by the code controller 107 partitioning the set of orthogonal spreading codes into different types and numbers of subsets of orthogonal spreading codes having differing numbers of spreading codes (e.g. bandwidth), which are then assigned to users.

In conventional CDMA systems, the maximum simultaneous users (at 1×bandwidth) are limited by multiple access interference. This is dependent on a number of factors but is commonly in the range of 60–70% of the spreading code set size. Additional users beyond that level will affect the quality of the channel for all users.

However, in the disclosed method according to embodiments of the invention, the number of users can be a simple linear deterministic relation, and the code controller 107 always knows when the limit is reached because the limit is known a priori, based on the encoding method, rather than the channel characteristics. Even under maximum utilization, only 50% of the spreading codes would be present in the channel at any given instant. Thus, multiple access interference limiting is less likely to occur because it does not reach the higher simultaneous code usage levels of a conventional system.

Another consequence of this is a reduction in the transmitted peak-to-average ratio. For any given channel bandwidth, the disclosed method requires fewer spreading codes be transmitted to achieve that bandwidth, compared to conventional methods.

Figure 4A:
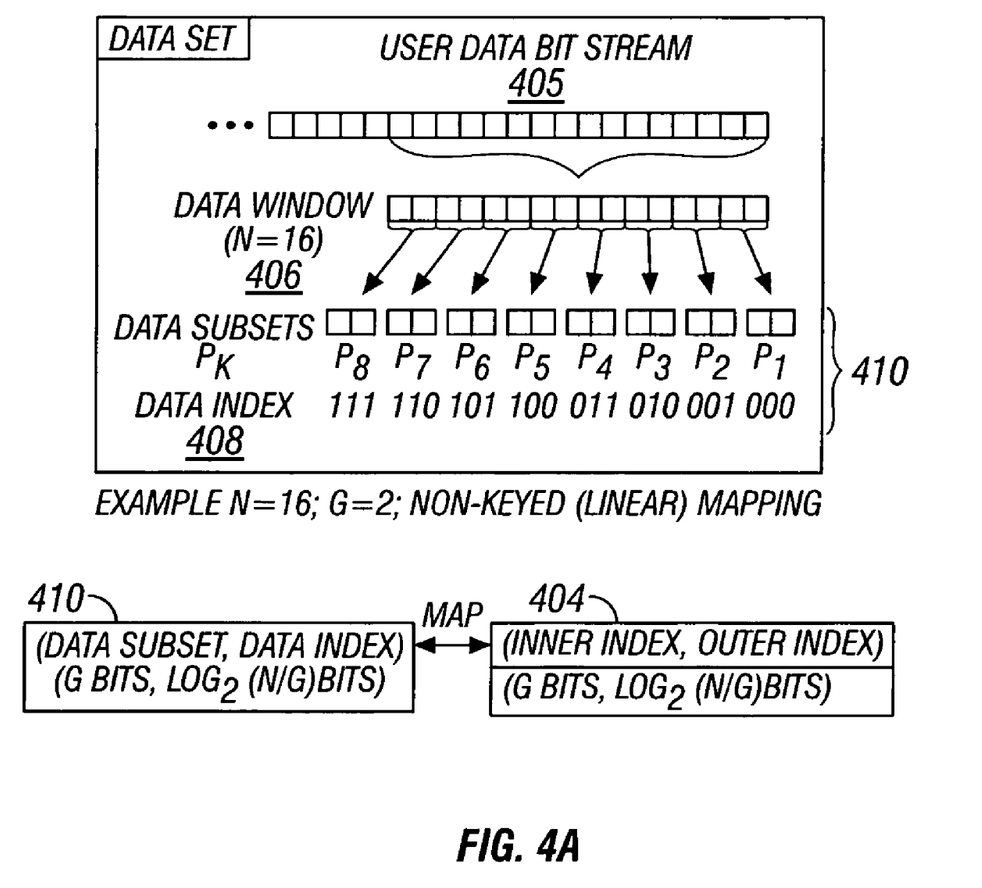
FIG. 4 provides an example of data sets and orthogonal code sets used in a multi-bit and multi-code orthogonal multiplexing method for multiple user access according to one embodiment of the invention.
Figure 4B:
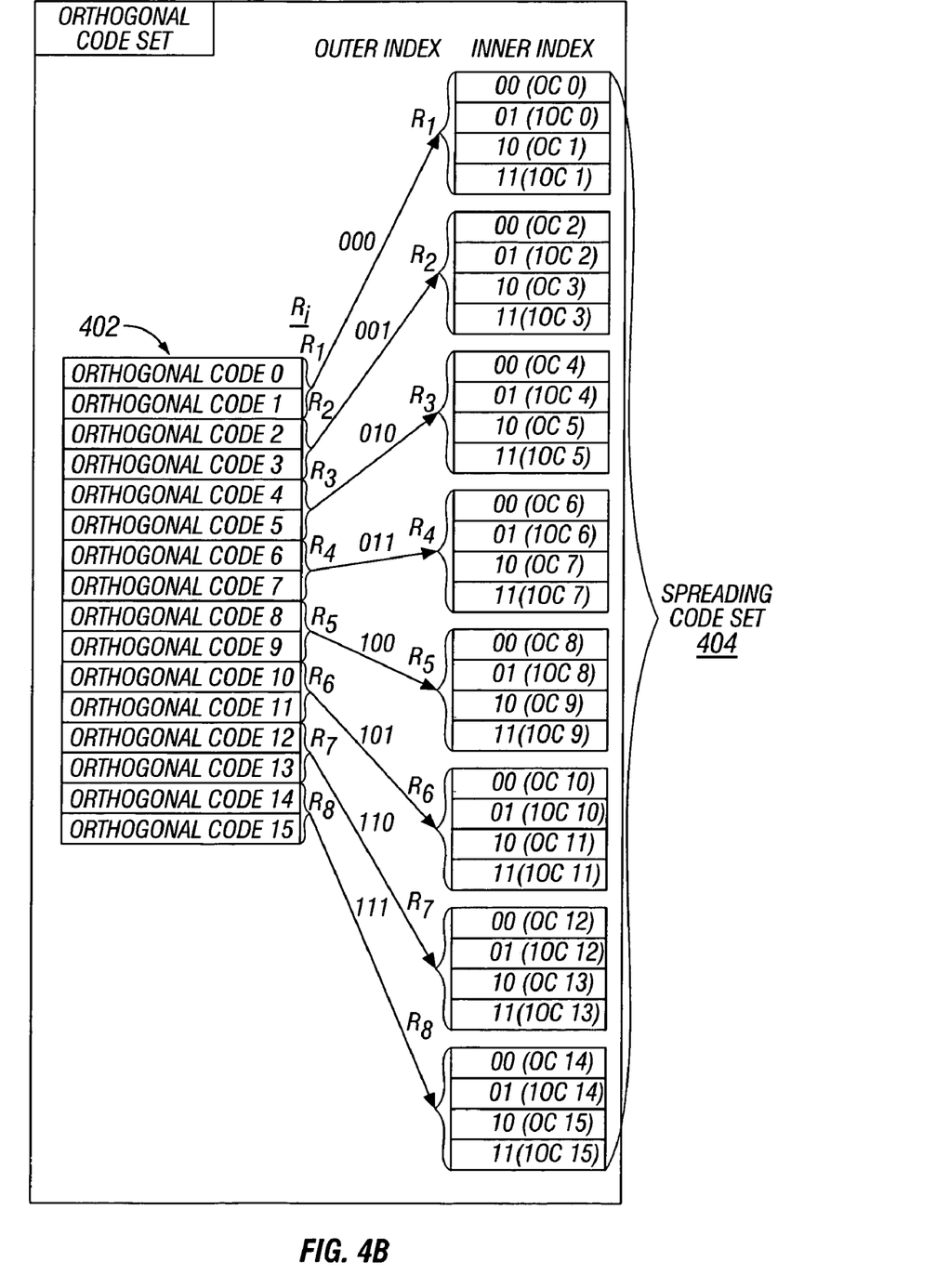

The multi-bit and multi-code orthogonal multiplexing method of FIGS. 2a, 2b, and 2c will now be discussed and illustrated with particular reference to FIG. 4, in which FIG. 4 provides an example of data sets and orthogonal code sets used in a multi-bit and multi-code orthogonal multiplexing method for multiple user access according to one embodiment of the invention. Particularly, a generalized procedure for creating the orthogonal code multiplex and recovering the original data from the code multiplex in its proper sequence will be described with this particular example.

As previously discussed, at block 203, a set of orthogonal spreading codes is selected by the code controller 107. Next, the set of orthogonal spreading codes is then partitioned into subsets of orthogonal spreading codes which are allocated and transmitted to users (e.g. transmitter devices 102 and receiver devices 104) (blocks 205, 207, 209) based upon bandwidth considerations, as previously discussed.

Particularly, as shown in FIG. 4, a subset of orthogonal spreading codes 402 that is square (e.g. N×N), where N is a power of 2, is shown. It is assumed that this subset of orthogonal codes 402 has been transmitted from the code controller 107 to the transmitter device 102. In the present example of FIG. 4, N=16, and thus the orthogonal codes 0–15 are shown. Next, the subset of orthogonal spreading codes is partitioned into partitioned sets (block 204). Particularly, in the example of FIG. 4, the orthogonal codes are partitioned into groups of size G (e.g. G=2). Thus, there are N/G (e.g. 8) partitioned groups of size G (e.g. 2). As shown in FIG. 4, these groups are denoted as $R_i$, i=1 to N/G (e.g. 8), such that they are shown as $R_1$, $R_2$, $R_3$, $R_4$, $R_5$, $R_6$, $R_7$, and $R_8$. The subscript i corresponds to the outer index in FIG. 4.

The partitioned sets are then expanded to include the complement codes of the orthogonal spreading codes and the orthogonal spreading codes and the complement codes of the orthogonal spreading codes are mapped into a code index to create a spreading code set 404 (block 206). Particularly, the G codes (e.g. G=2) in each group $R_1$ are expanded to include the complement codes such that a total of 2*G (e.g. 4) codes are present per $R_i$. These 2*G (e.g. 4) codes per $R_i$ are mapped in a 1:1 mapping (i.e. the ($\log_2$(2*G))-bit codes that represent $2^G$ objects). This is repeated for each of the N/G (e.g. 8) groups designated by $R_1$ (e.g. $R_1$, $R_2$, $R_3$, $R_4$, $R_5$, $R_6$, $R_7$, and $R_8$) to complete the inner mapping of the partitioned orthogonal spreading codes and the complement codes of the orthogonal spreading codes into the inner code index to create the spreading code set 404. The outer mapping to assign the outer index is via the i subscript from the sequence of the $R_i$ (as shown in FIG. 4: $R_1$, $R_2$, $R_3$, $R_4$, $R_5$, $R_6$, $R_7$, and $R_8$). In the example of FIG. 4, this is shown as a direct linear mapping, for clarity. However, the mappings may also be scrambled via an encryption key for enhanced security.

It should be appreciated that the results of the partitioning, mapping, and sequence method blocks and definitions (blocks 202, 204, and 206), i.e., the orthogonal spreading codes, the partitioned orthogonal spreading codes, the expanded partitioned sets including complements, the code index, the spreading code set, etc., as previously discussed, are usually required to be known at the receiver device 104, a priori, for the method to work properly.

Looking at the input data, the contiguous user input data 405 is partitioned into a data window of size N (e.g. N=16) 406, which is equal to the size of the orthogonal spreading code (or the length of an individual spreading code, which is the same size (i.e. the orthogonal code set is (N×N)). The input data of the data window 406 is then partitioned into equal-sized subsets of G (e.g. G=2) to preserve the natural order (block 208). It should be noted that the data subsets have a minimum size of 2 bits, and the data window 406 is formed such that it can be broken up into equally sized data subsets. These equal-sized data subsets can be termed $P_k$, k=1 to N/G (e.g. 8), for easy reference, such that, as shown in FIG. 4, the equal sized data subsets $P_k$ are shown as $P_1$, $P_2$, $P_3$, $P_4$, $P_5$, $P_6$, $P_7$, and $P_8$. Next, the ordered equal-sized data subsets are mapped into a data index 408 to create a data set 410 (block 210).

The data set 410 is then mapped to the spreading code set 404 to create a multiplex of spreading codes (block 212). Particularly, the ordered $P_k$'s are mapped to the ordered $R_1$'s to create a set of N/G (e.g. 8) orthogonal codes (i.e. to create the multiplex of spreading codes). Next, the multiplex of spreading codes are summed to create a code multiplex (block 214). These previously described operations (e.g. blocks 204 through 214) represent what could be termed the transmit multiplex construction operation, in that, these operations create a code multiplex at the transmitter device 102, which is ultimately transmitted via link 106, to the receiver device 104. Accordingly, the code multiplex is transmitted to the receiver device 104 (block 220).

As previously described with reference to FIG. 2c, at the receiver side (e.g. at the receiver device 102), the code multiplex is received (block 220) and passed through a correlator to extract all of the orthogonal code components from the code multiplex (block 252). Moreover, as previously discussed, the reverse of the transmit multiplex construction operation is performed to unmap, unpartition, and sequence the input data (block 254), such that the original N-bit input data (e.g. data window 406) is yielded in the original order (block 258).

It should be noted that there are an infinite number of partitioning schemes and sizes, as well as, subsequent mapping methods that can be used. The disclosed method advantageously produces 100 percent efficiency for all power-of-2, N by N (N×N square matrix), orthogonal spreading code sets. This is in comparison to the efficiency of (1/N)*100% for conventional DSSS and DS CDMA systems (where N is the spreading code length). In addition, the peak-to-average ratio (PAR) is reduced for the disclosed method since N user bits are conveyed via N/2 spreading codes in the multiplex.

As previously discussed, in the prior art DSSS and DS CDMA systems, multiple stations simultaneously convey one bit of information. However, in the embodiments of the present invention, each user pair (e.g. a transmitter device 102 and a receiver device 104) share a common set of spreading code sets 404 (e.g. N=16 spreading codes), and use data-dependent encoding of user-data-to-spreading-codes for the purpose of increasing the transmit capacity (e.g. by a factor of 16 in the example embodiment). Accordingly, point-to-point increased bandwidth is provided between a transmitter device 102 and a receiver device 104. Moreover, user pairs (e.g. transmitter devices 102 and receiver devices 104) are assumed to be a part of a multi-diversity multiple access network, where multiple frequencies and multiple timeslots are available to all individual users. Furthermore, in embodiments of the present invention, a spreading code set 404 (which is common to a user pair—e.g. a transmitter device 102 and a receiver device 104) is used to allow the reconstruction of the sequence of input data, which is implicitly conveyed without any overhead.

Also, it should be noted, that as to the previously described method, the most simple and direct mapping assignments were used to simplify the description. In mapping the orthogonal spreading codes after they have been partitioned, there are actually a large number of possible ways to perform the mapping to indexes (e.g. the outer and inner indexes of FIG. 4). Thus, by using this mapping flexibility, a security layer can be added on top of the disclosed method.

In conclusion, embodiments of the present invention allow for a dynamically-scalable system that utilizes multi-bit and multi-code orthogonal multiplexing to allow for multiple user access (e.g. multiple users each transmitting and/or receiving multi-bit data via transmitter and receiver devices) to achieve high bit densities in a direct sequence spread spectrum (DSSS) system. Moreover, embodiments of the present invention allow for a zero-overhead method for sequence reversible and pattern independent orthogonal multiplexing, by using two independent sets of multiple partitioning and mapping operations to normalize a data set and a spreading codes set. One set of operations is performed on the data set, and the other on the spreading code set. This is followed by a final mapping of one normalized set onto the other. For both initial sets, the partitioning and mapping operations reduce the sets to a common abstract representation. This allows the data set to be mapped to the spreading code set through an abstraction interface. The actual values are hidden behind the abstraction layer that joins the two sets with a common parameter interface.

Advantageously, this allows the data set to be mapped to the spreading code set without consideration for repeated values, run-length (consecutive 1's), or 0/1 balance. The partitioning and mapping steps applied to the spreading code set insures that no spreading code will be added to the multiplex more than once, irrespective of repetitive input data. Moreover, a multiplex of distinct orthogonal spreading codes can be transmitted per transmit opportunity—rather than a single code—such that multiple bits of data can be conveyed. Furthermore, the sequence information is recoverable at the receiver device without overhead because the overall partitioning and mapping process—which involves defined sequences of operations—is known to the receiver device.

While the present invention and its various functional components have been described in particular embodiments, it should be appreciated the present invention can be implemented in hardware, software, firmware, middleware or a combination thereof and utilized in systems, subsystems, components, or sub-components thereof. When implemented in software, the elements of the present invention are the instructions/code segments to perform the necessary tasks. The program or code segments can be stored in a machine readable medium (e.g. a processor readable medium or a computer program product), or transmitted by a computer data signal embodied in a carrier wave, or a signal modulated by a carrier, over a transmission medium or communication link. The machine-readable medium may include any medium that can store or transfer information in a form readable and executable by a machine (e.g. a processor, a computer, etc.). Examples of the machine-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via networks such as the Internet, Intranet, etc.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
    partitioning a set of orthogonal spreading codes into a plurality of subsets of orthogonal spreading codes;
    allocating subsets of orthogonal spreading codes to users;
    transmitting the allocated subsets of orthogonal spreading codes to users;
    partitioning a subset of orthogonal spreading codes allocated to a user to create a spreading code set including partitioning the subset of orthogonal spreading codes into partitioned sets, expanding the partitioned sets to include complement codes of the orthogonal spreading codes, and mapping the orthogonal spreading codes and the complement codes of the orthogonal spreading codes into a code index to create the spreading code set;
    partitioning input data to create a data set;
    mapping the data set to the spreading code set to create a code multiplex; and
    transmitting the code multiplex.

2. The method of claim 1, wherein, the number of orthogonal spreading codes of the set of orthogonal spreading codes is a power of two.

3. The method of claim 1, wherein, subsets of orthogonal spreading codes are dynamically allocated to users.

4. The method of claim 1, wherein, at least one subset of orthogonal spreading codes allocated to a user has a different quantity of orthogonal spreading codes than one other subset of spreading codes allocated to another user such that at least two users are allocated different bandwidths.

5. The method of claim 1, wherein, subsets of orthogonal spreading codes are dynamically allocated to users, and wherein, at least one of the dynamically allocated subset of orthogonal spreading codes allocated to a user has a different quantity of orthogonal spreading codes than one other dynamically allocated subset of spreading codes allocated to another user such that at least two users are dynamically allocated different bandwitdths.

6. The method of claim 1, wherein, users include transmitter devices and receiver devices.

7. The method of claim 1, wherein, partitioning input data to create a data set further includes partitioning the input data into equal-sized subsets of data.

8. The method of claim 7, wherein, creating a data set further includes mapping the equal sized subsets of data into a data index.

9. The method of claim 1, wherein, creating a code multiplex further includes:
mapping the data set to the spreading codes to create a multiplex of spreading codes; and
summing the multiplex of spreading codes to form the code multiplex.

10. The method of claim 1, further comprising receiving the code multiplex.

11. The method of claim 10, further comprising extracting orthogonal code components from the code multiplex.

12. The method of claim 11, further comprising:
unmapping the code multiplex; and
unpartitioning the code multiplex.

13. The method of claim 12, further comprising:
sequencing the unmapped and unpartitioned code multiplex to yield the input data.

14. A system comprising:
a code controller to:
partition a set of orthogonal spreading codes into a plurality of subsets of orthogonal spreading codes;
allocate subsets of orthogonal spreading codes to users; and
transmit the allocated subsets of orthogonal spreading codes to users;
a transmitter device to:
partition a subset of orthogonal spreading codes allocated to a user to create a spreading code set, wherein the partition is to partition the subset of orthogonal spreading codes into partitioned sets, expand the partitioned sets to include complement codes of the orthogonal spreading codes, and map the orthogonal spreading codes and the complement codes of the orthogonal spreading codes into a code index to create the spreading code set;
partition input data to create a data set;
map the data set to the spreading code set to create a code multiplex; and
transmit the code multiplex; and
a receiver device to receive the code multiplex.

15. The system of claim 14, wherein, the number of orthogonal spreading codes of the set of orthogonal spreading codes is a power of two.

16. The system of claim 14, wherein, subsets of orthogonal spreading codes are dynamically allocated to users.

17. The system of claim 14, wherein, at least one subset of orthogonal spreading codes allocated to a user has a different quantity of orthogonal spreading codes than one other subset of spreading codes allocated to another user such that at least two users are allocated different bandwidths.

18. The system of claim 14, wherein, subsets of orthogonal spreading codes are dynamically allocated to users, and wherein, at least one of the dynamically allocated subset of orthogonal spreading codes allocated to a user has a different quantity of orthogonal spreading codes than one other dynamically allocated subset of spreading codes allocated to another user such that at least two users are dynamically allocated different bandwidths.

19. The system of claim 14, wherein, to partition input data to create a data set further includes to partition the input data into equal-sized subsets of data.

20. The system of claim 19, wherein, to create a data set further includes to map the equal-sized subsets of data into a data index.

21. The system of claim 14, wherein, to create a code multiplex further includes:
map the data set to the spreading codes to create a multiplex of spreading codes; and
sum the multiplex of spreading codes to form the code multiplex.

22. The system of claim 14, wherein, the receiver device extracts orthogonal code components from the code multiplex.

23. The system of claim 22, wherein the receiver device further is to:
unmap the code multiplex; and
unpartition the code multiplex.

24. The system of claim 23, wherein the receiver device further: is to:
sequence the unmapped and unpartitioned code multiplex to yield the input data.

25. A transmitter device comprising:
a processor to:
partition a subset of orthogonal spreading codes allocated to a user by a code controller to create a spreading code set, wherein to partition is to partition the subset of orthogonal spreading codes into partitioned sets, expand the partitioned sets to includes complement codes of the orthogonal spreading codes, and map the orthogonal spreading codes and the complement codes of the orthogonal spreading codes into a code index to create the spreading code set;
partition input data to create a data set; and
map the data set to the spreading code set to create a code multiplex; and
a transmitter interface to transmit the code multiplex through a link to a receiver device.

26. The transmitter device of claim 25, wherein, the number of orthogonal spreading codes of the set of orthogonal spreading codes is a power of two.

27. The transmitter device of claim 25, wherein, subsets of orthogonal spreading codes are dynamically allocated to users.

28. The transmitter device of claim 25, wherein, at least one subset of orthogonal spreading codes allocated to the user has a different quantity of orthogonal spreading codes than one other subset of spreading codes allocated to another user such that at least two users are allocated different bandwidths.

29. The transmitter device of claim 25, wherein, subsets of orthogonal spreading codes are dynamically allocated to users, and wherein, at least one of the dynamically allocated subset of orthogonal spreading codes allocated to a user has a different quantity of orthogonal spreading codes that one other dynamically allocated subset of spreading codes allocated to another user such that at least two users are dynamically allocated different bandwidths.

30. The transmitter device of claim 25, wherein, to partition input data to create a data set further includes to partition the input data into equal-sized subsets of data.

31. The transmitter device of claim 30, wherein, to create a data set further includes to map the equal-sized subsets of data into a data index.

32. The transmitter device of claim 25, wherein, to create a code multiplex further includes:
map the data set to the spreading codes to create a multiplex of spreading codes and;

sum the multiplex of spreading codes to form the code multiplex.

33. A machine-readable medium having stored thereon instructions, which when executed by a transmitter device, cause the transmitter device to perform the following operations:
partition a subset of orthogonal spreading codes allocated to a user by a code controller to create a spreading code set, wherein to partition is to partition the subset of orthogonal spreading codes into partitioned sets, expand the partitioned sets to includes complement codes of the orthogonal spreading codes, and map the orthogonal spreading codes and the complement codes of the orthogonal spreading codes into a code index to create the spreading code set;
partition input data to create a data set;
map the data set to the spreading code set to create a code multiplex; and
transmit the code multiplex through a link to a receiver device.

34. The machine-readable medium of claim 33, wherein, the number of orthogonal spreading codes of the set of orthogonal spreading codes is a power of two.

35. The machine-readable medium of claim 33, wherein, subsets of orthogonal spreading codes are dynamically allocated to users.

36. The machine-readable medium of claim 33, wherein, at least one subset of orthogonal spreading codes allocated to a user has a different quantity of orthogonal spreading codes than one other subset of spreading codes allocated to another user such that at least two users are allocated different bandwidths.

37. The machine-readable medium of claim 33, wherein, subsets of orthogonal spreading codes are dynamically allocated to users, and wherein, at least one of the dynamically allocated subset of orthogonal spreading codes allocated to a user has a different quantity of orthogonal spreading codes than one other dynamically allocated subset of spreading codes allocated to another user such that at least two different users are dynamically allocated different bandwidths.

38. The machine-readable medium of claim 33, wherein, instructions which when executed by a transmitter device, cause the transmitter device to partition input data to create a data set further includes instruction which when executed by a transmitter device, cause the transmitter device to partition the input data into equal-sized subsets of data.

39. The machine-readable medium of claim 38, wherein, instructions which when executed by a transmitter device, cause the transmitter device to create a data set further includes instructions which when executed by a transmitter device, cause the transmitter device to map the equal-sized subsets of data into a data index.

40. The machine-readable medium of claim 33, wherein, creating a code multiplex further includes instructions which when executed by a transmitter device, cause the transmitter device to:
map the data set to the spreading codes to create a multiplex of spreading codes; and sum the multiplex of spreading codes to form the code multiplex.

41. A method comprising:
partitioning a set of orthogonal spreading codes into a plurality of subsets of orthogonal spreading codes;
allocating subsets of orthogonal spreading codes to users;
transmitting the allocated subsets of orthogonal spreading codes to users;
partitioning a subset of orthogonal spreading codes allocated to a user to create a spreading code set;
partitioning input data to create a data set, wherein partitioning input data includes partitioning the input data into equal-sized subsets of data and creating the data set includes mapping the equal sized subsets of data into a data index;
mapping the data set to the spreading code set to create a code multiplex; and
transmitting the code multiplex.

42. The method of claim 41, wherein, the number of orthogonal spreading codes of the set of orthogonal spreading codes is a power of two.

43. The method of claim 41, wherein, subsets of orthogonal spreading codes are dynamically allocated to users.

44. The method of claim 41, wherein, at least one subset of orthogonal spreading codes allocated to a user has a different quantity of orthogonal spreading codes than one other subset of spreading codes allocated to another user such that at least two users are allocated different bandwidths.

45. The method of claim 41, wherein, subsets of orthogonal spreading codes are dynamically allocated to users, and wherein, at least one of the dynamically allocated subset of orthogonal spreading codes allocated to a user has a different quantity of orthogonal spreading codes than one other dynamically allocated subset of spreading codes allocated to another user such that at least two users are dynamically allocated different bandwitdths.

46. The method of claim 41, wherein, users include transmitter devices and receiver devices.

47. The method of claim 41, wherein, partitioning the subset of orthogonal spreading codes allocated to a user further includes:
partitioning the subset of orthogonal spreading codes into partitioned sets;
expanding the partitioned sets to includes complement codes of the orthogonal spreading codes; and
mapping the orthogonal spreading codes and the complement codes of the orthogonal spreading codes into a code index to create the spreading code set.

48. The method of claim 41, wherein, creating a code multiplex further includes:
mapping the data set to the spreading codes to create a multiplex of spreading codes; and
summing the multiplex of spreading codes to form the code multiplex.

49. The method of claim 41, further comprising receiving the code multiplex.

50. The method of claim 49, further comprising extracting orthogonal code components from the code multiplex.

51. The method of claim 50, further comprising:
unmapping the code multiples; and
unpartitioning the code multiplex.

52. The method of claim 51, further comprising:
sequencing the unmapped and unpartitioned code multiplex to yield the input data.

53. A system comprising:
a code controller to:
partition a set of orthogonal spreading codes into a plurality of subsets of orthogonal spreading codes;
allocate subsets of orthogonal spreading codes to users; and
transmit the allocated subsets of orthogonal spreading codes to users;
a transmitter device to:

partition a subset of orthogonal spreading codes allocated to a user to create a spreading code set;

partition input data to create a data set, wherein partition the input data includes partition the input data into equal-sized subsets of data and create the data set includes map the equal sized subsets of data into a data index;

map the data set to the spreading code set to create a code multiplex; and transmit the code multiplex; and a receiver device to receive the code multiplex.

54. The system of claim 53, wherein, the number of orthogonal spreading codes of the set of orthogonal spreading codes is a power of two.

55. The system of claim 53, wherein, subsets of orthogonal spreading codes are dynamically allocated to users.

56. The system of claim 53, wherein, at least one subset of orthogonal spreading codes allocated to a user has a different quantity of orthogonal spreading codes than one other subset of spreading codes allocated to another user such that at least two users are allocated different bandwidths.

57. The system of claim 53, wherein, subsets of orthogonal spreading codes are dynamically allocated to users, and wherein, at least one of the dynamically allocated subset of orthogonal spreading codes allocated to a user has a different quantity of orthogonal spreading codes than one other dynamically allocated subset of spreading codes allocated to another user such that at least two users are dynamically allocated different bandwidths.

58. The system of claim 53, wherein, to partition the subset of orthogonal spreading codes allocated to a user further includes:

partition the subset of orthogonal spreading codes into partitioned sets;

expand the partitioned sets to include complement codes of the orthogonal spreading codes; and map the orthogonal spreading codes and the complement codes of the orthogonal spreading codes into a code index to create the spreading code set.

59. The system of claim 53, wherein, to create a code multiplex further includes:

map the data set to the spreading codes to create a multiplex of spreading codes; and sum the multiplex of spreading codes to form the code multiplex.

60. The system of claim 53, wherein, the receiver device extracts orthogonal code components from the code multiplex.

61. The system of claim 60, wherein the receiver device further is to:

unmap the code multiplex; and unpartition the code multiplex.

62. The system of claim 61, wherein the receiver device further is to:

sequence the unmapped and unpartitioned code multiplex to yield the input data.

63. A transmitter device comprising:

a processor to:

partition a subset of orthogonal spreading codes allocated to a user by a code controller to create a spreading code set;

partition input data to create a data set, wherein to partition input data includes partition the input data into equal-sized subsets of data and create the data set includes map the equal sized subsets of data into a data index; and map the data set to the spreading code set to create a code multiplex; and a transmitter interface to transmit the code multiplex through a link to a receiver device.

64. The transmitter device of claim 63, wherein, the number of orthogonal spreading codes of the set of orthogonal spreading codes is a power of two.

65. The transmitter device of claim 63, wherein, subsets of orthogonal spreading codes are dynamically allocated to users.

66. The transmitter device of claim 63, wherein, at least one subset of orthogonal spreading codes allocated to the user has a different quantity of orthogonal spreading codes than one other subset of spreading codes allocated to another user such that at least two users are allocated different bandwidths.

67. The transmitter device of claim 63, wherein, subsets of orthogonal spreading codes are dynamically allocated to users, and wherein, at least one of the dynamically allocated subset of orthogonal spreading codes allocated to a user has a different quantity of orthogonal spreading codes that one other dynamically allocated subset of spreading codes allocated to another user such that at least two users are dynamically allocated different bandwidths.

68. The transmitter device of claim 63, wherein, to partition the subset of orthogonal spreading codes allocated to a user further includes:

partition the subset of orthogonal spreading codes into partitioned sets;

expand the partitioned sets to include complement codes of the orthongoal spreading codes; and map the orthogonal spreading codes and the complement codes of the orthongonal spreading codes into a code index to create the spreading code set.

69. The transmitter device of claim 63, wherein, to create a code multiplex further includes:

map the data set to the spreading codes to create a multiplex of spreading codes; and sum the multiplex of spreading codes to form the code multiplex.

70. A machine-readable medium having stored thereon instructions, which when executed by a transmitter device, cause the transmitter device to perform the following operations:

partition a subset of orthogonal spreading codes allocated to a user by a code controller to create a spreading code set;

partition input data to create a data set, wherein partition input data includes partition the input data into equal-sized subsets of data and create the data set includes mapping the equal sized subsets of data into a data index;

map the data set to the spreading code set to create a code multiplex; and transmit the code multiplex through ha link to a receiver device.

71. The machine-readable medium of claim 70, wherein, the number of orthogonal spreading codes of the set of orthogonal spreading codes is a power of two.

72. The machine-readable medium of claim 70, wherein, subsets or orthogonal spreading codes are dynamically allocated to users.

73. The machine-readable medium of claim 70, wherein, at least one subset of orthogonal spreading codes allocated to a user has a different quantity of orthogonal spreading codes than one other subset of spreading codes allocated to another user such that at least two users are allocated different bandwidths.

74. The machine-readable medium of claim 70, wherein, subsets of orthogonal spreading codes are dynamically allocated to users, and wherein, at least one of the dynamically allocated subset of orthogonal spreading codes allocated to a user has a different quantity of orthogonal spreading codes than one other dynamically allocated subset of spreading codes allocated to another user such that at least two different users are dynamically allocated different bandwidths.

75. The machine-readable medium of claim 70, wherein, partitioning the subset of orthogonal spreading codes allocated to a user further includes instructions to:

partition the subset of orthogonal spreading codes into partitioned sets;

expand the partitioned sets to include complement codes of the orthogonal spreading codes; and map the orthogonal spreading codes and the complement codes of the orthogonal spreading codes into a code index to create the spreading code set.

76. The machine-readable medium of claim 70, wherein, to create a code multiplex further includes instructions to:

map the data set to the spreading codes to create a multiplex of spreading codes; and summing the multiplex of spreading codes to form the code multiplex.

\* \* \* \* \*